Oct. 19, 1926.
R. S. PEIRCE
FASTENING DEVICE
Filed Dec. 3, 1923
1,603,292
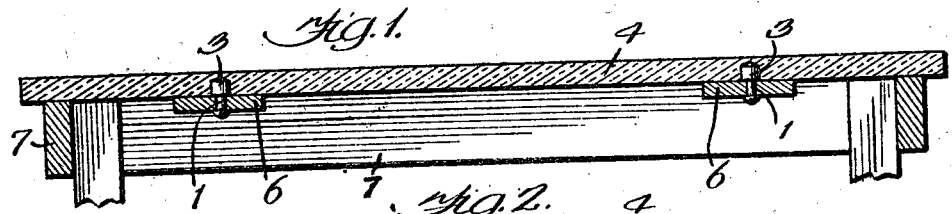
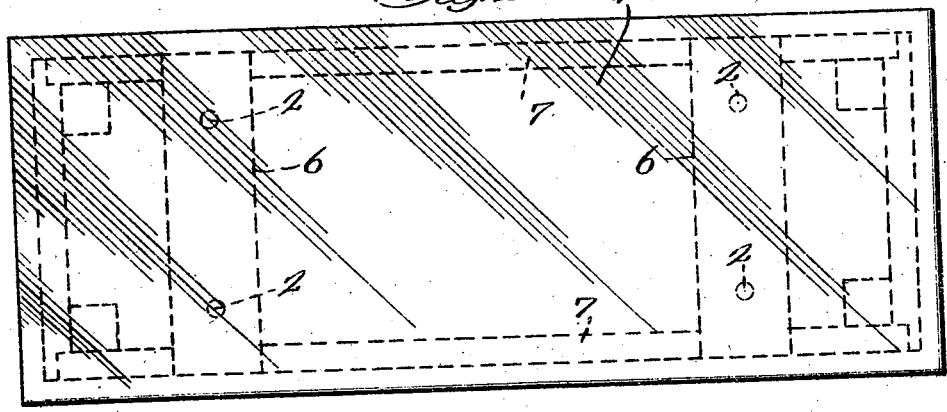
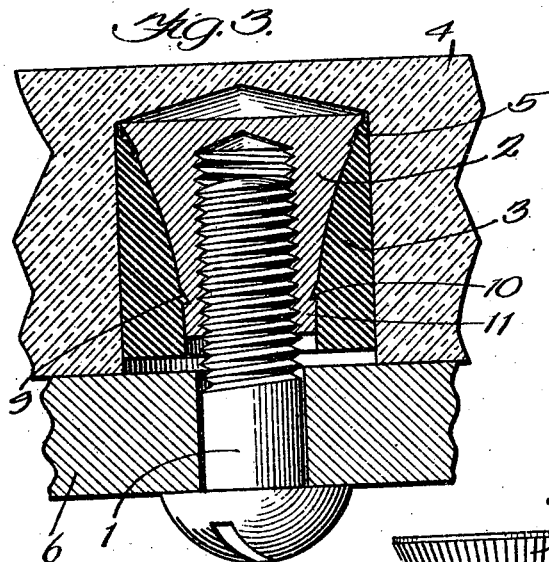
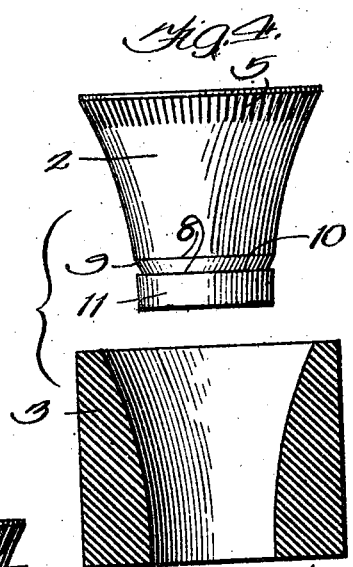
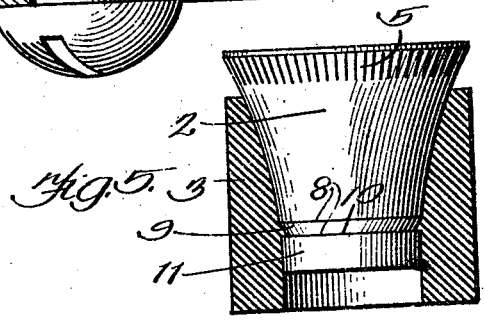
Inventor:
Ralph S. Peirce Patented Oct. 19, 1926.

1,603,292

UNITED STATES PATENT OFFICE.

RALPH S. PEIRCE, OF HINSDALE, ILLINOIS.

FASTENING DEVICE.

Application filed December 3, 1923. Serial No. 678,215.

My invention relates to fastening devices employing bolts, nuts upon the bolts, and holding elements engaging lateral portions of the nuts and serving to effect the assembly thereof with the objects to which the fastening devices are to be supplied.

The invention has a number of objects and advantages in view. In accordance with one feature of the invention, the nut has an end wall at the inner end of its bore to serve as a guard to limit the extent to which the bolt may be inserted within the nut. This feature of my invention is of particular service where such fastening devices are assembled with brittle objects such as the glass tops of restaurant tables and counters.

In the preferred embodiment of the invention, the wall at the inner end of the bore of the nut is imperforate to prevent foreign matter from entering the bore of the nut from the recess or hole in the object receiving the fastening device.

In accordance with another characteristic of the invention, the holding element surrounds the nut and is soft relatively thereto, and the nut is provided with a roughened formation at its wider end for entering the holding element to prevent the nut from turning therein.

In accordance with another characteristic of the invention, the nut is curved inwardly longitudinally thereof, and in a manner to make the nut taper from its larger end to its smaller end. The nut may have spreading engagement with the holding element throughout the zone where the holding element surrounds the nut, the curved nut having intimate expanding contact with the holding element surrounded thereby.

The invention has other characteristics and will be more fully explained in connection with the accompanying drawing in which Fig. 1 is a longitudinal sectional view of the upper portion of a table equipped with a glass top assembled with the balance of the table structure by means of the devices of my invention; Fig. 2 is a plan view of the structure shown in Fig. 1; Fig. 3 is an axial sectional view through one of the fastening devices and contiguous parts, the bolt of the fastening device being shown in elevation; Fig. 4 illustrates the nut and the holding element that is to surround the same in separated relation; and Fig. 5 is a view illustrating the nut and holding element in assembly as an independent unit in readiness for the reception of the fastening bolt when the device is to be used to effect the assembly of other parts, as, for example, illustrated in Figs. 1 and 2.

Like parts are indicated by similar characters of reference throughout the different figures.

The fastening device illustrated includes a threaded bolt 1 having a nut 2 threaded thereon and provided with a holding element 3 engaged by a lateral portion of the nut, the nut being of wedging formation to press outwardly upon the holding element. The nut may be of hard metal, such as brass or iron. The holding element may completely surround the nut and is desirably formed of softer metal such as lead. The nut and the holding formation are first assembled with the object, such as the glass table top 4 which is formed with a hole to receive the nut and holding element. A suitable staking tool having an annular end, is placed upon the outer end of the holding element and is then pounded by a hammer to crowd it between the nut and the surrounding object 4. The nut, being of wedging formation, causes the material of the holding element to be crowded into the space between the nut and the surrounding object 4 whereby the nut is brought into assembly with such object and is held in position to admit the bolt 1 to be inserted therein. The bolt, in the example illustrated, is passed through a strut 6 extending between the opposite aprons 7 of the table whereby the glass top 4 may be firmly assembled with this strut. As illustrated, there are two such struts 6 with which the table top is thus assembled.

In order that each hole in the glass table top may not need to be extended entirely therethrough to mar the appearance thereof, I provide means whereby each bolt cannot be screwed through its nut to an extent to reach the table top. To this end, the threading of the bore of each nut terminates before the larger end of the nut is reached, there being left an end wall which sufficiently overlies the bore to act as an abutment to prevent further progress of the bolt. In order that the foreign matter left in forming the hole that receives the nut may not enter the nut, I desirably extend this wall entirely across the bore of the nut and make it imperforate. In order that the nut may not be turned within its holding element 3 when the inner end of the bolt reaches the inner end of the nut I provide the nut with a roughened formation 5 at its wider end, this roughened formation entering the holding element and preventing the nut from turning therein.

The nut is desirably annular in its various cross sections and is inwardly curved longitudinally thereof. This curving formation affords uniform engagement between the nut and its holding element throughout the zone in which the nut is surrounded by the holding element so that when the holding element is pounded into place it is subject to uniform crowding action and exerts firm holding engagement with the nut throughout the zone in which the nut is surrounded thereby. In order that the nut and its holding element may be supplied as a unitary structure apart from the complemental bolt, I form the nut with an indentation 8, this indentation being preferably annular. The holding element is placed upon the nut and is sufficiently compressed to have a portion thereof exuded into the indentation. The indentation desirably has a surface 9 that slopes toward the wider end of the nut and a shoulder 10 that prevents the holding element from being withdrawn from the nut after having once been assembled therewith.

In the preferred embodiment of the invention the nut is formed with an extension 11 at its smaller end whose exterior longitudinal surface is parallel with the axis of the nut whereby the nut may be adapted to various lengths of bolts and various lengths of the holding element without interfering with the assembly of the holding elements and nuts.

I claim:

1. In a fastening device, the combination with a threaded bolt; of a nut threaded upon said bolt; and a holding element surrounding said nut and soft relatively thereto, said nut being of wedging formation where engaging said holding element and having a roughened formation at its wider end for entering said holding element to prevent the nut from turning therein.

2. In a fastening device, the combination with a nut; of a holding element surrounding said nut and soft relatively thereto, said nut being of wedging formation where engaging said holding element, said nut having an indentation upon its side that receives a portion of the holding element that maintains the holding element and nut in assembly.

3. In a fastening device, the combination with a nut; of a holding element surrounding said nut and soft relatively thereto, said nut being of wedging formation where engaging said holding element, said nut having an indentation upon its side that receives a portion of the holding element that maintains the holding element and nut in assembly, said indentation sloping at one end toward the larger end of the nut.

4. In a fastening device, the combination with a nut; of a holding element surrounding said nut and soft relatively thereto, said nut being of wedging formation where engaging said holding element, said nut having an indentation upon its side that receives a portion of the holding element that maintains the holding element and nut in assembly, said indentation sloping at one end toward the larger end of the nut and terminating at its other end in a shoulder.

5. In a fastening device, the combination with a nut having an imperforate end wall at the inner end of its bore; of a holding element surrounding said nut and soft relatively thereto, said nut being of wedging formation where engaging said holding element, said nut having an annular indentation upon its side that receives a portion of the holding element that maintains the holding element and nut in assembly.

6. In a fastening device, the combination with a nut having an imperforate end wall at the inner end of its bore; of a holding element surrounding said nut and soft relatively thereto, said nut being of wedging formation where engaging said holding element, said nut having an annular indentation upon its side that receives a portion of the holding element that maintains the holding element and nut in assembly, said indentation sloping at one end toward the larger end of the nut and terminating at its other end in a shoulder.

7. In a fastening device, the combination with a threaded bolt; of a nut threaded upon said bolt and having an imperforate end wall at the inner end of its bore; and a holding element surrounding said nut and soft relatively thereto, said nut being of wedging formation where engaging said holding element and having a roughened formation at a wider portion thereof for entering said holding element to prevent the nut from turning therein.

In witness whereof, I hereunto subscribe my name this 30th day of November A. D., 1923.

RALPH S. PEIRCE.